United States Patent [19]

Sato

[11] Patent Number: 4,945,439
[45] Date of Patent: Jul. 31, 1990

[54] SYNC CROSSTALK CANCELLING CIRCUIT

[75] Inventor: Shigemi Sato, Tokyo, Japan

[73] Assignee: Fostex Corporation of Japan, Tokyo, Japan

[21] Appl. No.: 388,295

[22] Filed: Jul. 25, 1989

Related U.S. Application Data

[63] Continuation of Ser. No. 153,244, Feb. 8, 1988, abandoned.

[30] Foreign Application Priority Data

Apr. 27, 1987 [JP] Japan ................................ 62-103612

[51] Int. Cl.$^5$ .............................................. G11B 5/12
[52] U.S. Cl. ................................................... 360/124
[58] Field of Search ........................................ 360/124

[56] References Cited

U.S. PATENT DOCUMENTS 4,008,493  2/1977  Pizzuto .............................. 360/124
4,072,994  2/1978  Takashima ........................ 360/124

Primary Examiner—Vincent P. Canney
Attorney, Agent, or Firm—Price, Gess & Ubell

[57] ABSTRACT

A sync crosstalk cancelling circuit features a record/playback head, capable of sync recording, molded in one piece with a record head section and playback head section and another record/playback head identically constructed. The recording head section of the record/playback heads are either connected in series or parallel at the same polarity, with the same recording current applied to both recording head sections, and at the same time, playback signals reverse in polarity to each other are obtained from the playback head sections of the record/playback heads, their gains adjusted and then applied to a mixing circuit. The mixing circuit outputs the playback signal with the crosstalk elements cancelled.

8 Claims, 1 Drawing Sheet

SYNC CROSSTALK CANCELLING CIRCUIT

This is a continuation of application Ser. No. 153,244, filed Feb. 8, 1988, for a SYNC CROSSTALK CANCELLING CIRCUIT and now abandoned.

BACKGROUND OF THE INVENTION

1. Field of the Invention

This invention relates to a sync crosstalk cancelling circuit which is capable of eliminating crosstalk occurring in multi-track recording (synchronized recording).

2. Description of the Prior Art

In the recording studio, for example, a multi-track recorder with 24 recording channels is used for sync recording and ping-pong recording to record audio signals on each channel, feeding the recorded audio signals into a mixer for mixing, and finally mixing down into two channels, left (L) and right (R), in a master recorder. The master recorder output is input into a disc cutting machine to produce an original disc recording or to dub a multiple number of tapes. The previously mentioned sync recording is the process of playback of a prerecorded channel sound while recording this sound onto another channel at the same time. Ping pong recording is the process of transferring the prerecorded channel sound onto another channel.

FIG. 1 shows a conventional multi-track recorder. In this schematic, 1 is the single molded record/playback head containing the recording head section 1a and the playback head 1b. The recording head section 1a and the playback head section 1b each handle separate tracks on the recording tape and, for example, the recording head section 1a writes the recording signal onto channel "a" and the playback head section 1b reads out the playback signal on channel "b". As shown in FIG. 2, channel "a" and channel "b" are located adjacent to each other on the tape.

The recording amplifier 2 drives the recording head section 1a upon receiving the recording signal. The playback amplifier 3 amplifies the output from the playback head section 1b. The circuit thus operates as follows.

Assume overdub (sync) recording. The audio signal recorded on channel "b" is read by the playback head 1b, amplified by the playback amplifier 3, and input to an audio amplifier (not shown). A speaker (not shown) is driven in accordance to the input signal by the audio amplifier and the playbacked sound output from the speaker. While listening to this sound, another sound is recorded on channel "a." Recording amplifier 2 drives the recording head section 1a and writes the recording signal on channel "a" of the tape.

Now assume ping pong recording (track bouncing). The audio signal recorded on channel "b" is read by the playback head 1b and after proper processing, is input to recording amplifier 2 as the recording signal. In other words, the playback amplifier 3 output (playback output signal) is input to recording amplifier 2 as the recording signal. Recording amplifier 2 drives the recording head section 1a to write the recording signal on channel "a" of the tape. In other words, the content recorded on channel "b" is recorded on channel "a" without any change.

In a multi-track recorder, sync recording and ping pong recording is accomplished using the record/playback head shown in FIG. 1. In this method, the recording head section 1a and the playback head section 1b are molded in one piece and are physically contained in a single head. Consequently, as the recording head section 1a and the playback head section 1b are positioned extremely close together, mutual inductance occurs between the coils. Signal mixing (crosstalk) between the recording head section 1a and the playback head section 1b cannot be avoided. For this reason, a specially constructed head of low crosstalk is generally employed. But accurate playback still cannot be obtained as the recording signal leaks from the coil of the recording section head 1a to the coil of the playback head section 1b thus overlapping on the playback signal. Also, during ping pong recording, there is always the danger of oscillation as a loop circuit is formed and positive feedback will be applied to the signal leaking in.

OBJECTS AND SUMMARY OF THE INVENTION

The present invention has as its object a sync crosstalk cancelling circuit for eliminating the above-described affect from crosstalk and to allow accurate playback.

This and other objects are accomplished by the outstanding feature of this invention which is a record/playback head 1 capable of sync recording, with a record head section and playback head section molded in one piece, and another record/playback head 11 constructed identical to head 1 not connected for recording or playback, with the recording head section of the record/playback heads 1 and 11 either connected in series or parallel at the same polarity, the same recording current being applied to both recording head sections. At the same time, playback signals reverse in polarity to each other are obtained from the playback head sections of the record/playback heads 1 and 11. Their gains are adjusted and then applied to a mixing circuit. The result is a playback signal with the crosstalk elements cancelled by the mixing circuit.

DESCRIPTION OF THE PREFERRED EMBODIMENT

Figure 3:
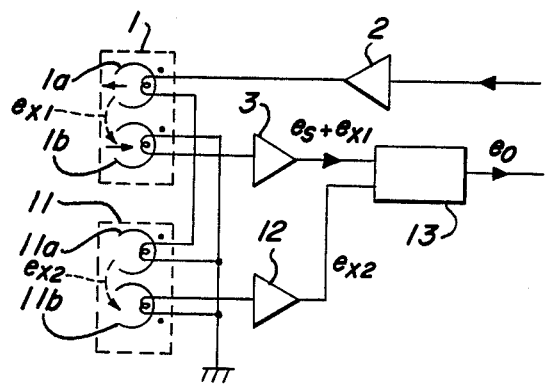
FIG. 3 is a schematic representative of a preferred embodiment of the present invention.

FIG. 3 is one example in block schematic. The same items in all the figures are indicated by the same reference numbers. In the schematic, 11 is the second record/playback head identical in construction to the first record/playback head 1. Said second record/playback head 11 also consists of a record head section 11a and playback head section 11b identical to record head section 1a and playback head section 1b in the first record/playback head 1. The second recording head section 11a is connected in series at the same polarity as the first recording head section 1a. The second playback head section 11b is connected in reverse polarity to that of the first playback head section 1b.

A playback amplifier 12 is connected for amplifying the detected signal from the second playback head section 11b. A mixing circuit 13 is connected for mixing the outputs of the first playback amplifier 3 and the second playback amplifier 12. The output of the mixing circuit 13 will be the playback signal. Actually, multiple number of pairs in the schematic (for example, 12 in a 24 channel equipment) are combined in a full circuit. Only one pair is shown here for the sake of simplicity. Circuit operation of such a composition are explained below.

First, after amplifying the recording signal with amplifier 2, the driving current applied to the first recording head section 1, will also flow in the second recording head section 11a. A portion of the recording current will leak by mutual inductance from the first and second recording heads 1a and 11a to the first and second playback heads 1b and 11b, respectively. The signal thus leaking is the previously mentioned crosstalk signal.

Now, the crosstalk signal leaking from the first recording head section 1a to the first playback head 1b shall be designated $e_{x1}$, and the crosstalk signal leaking from the second recording head section 11a to the second playback head section 11b shall be designated $e_{x2}$.

Figure 4:
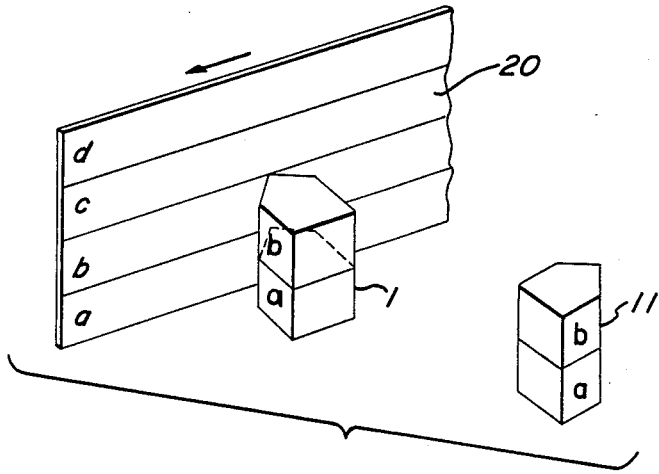
FIG. 4 is an abstract representative of the dual head structure used by the present invention and a multi-track recording medium.

The second record/playback head 11 is positioned so that it does not touch tape 20, as shown in FIG. 4. Therefore, only the first recording head section 1a actually records the recording signal on channel "a" of tape 20. In the same way, only the first playback head section 1b reads the playback signal on channel "b" of tape 20. The second record/playback head 11 is a dummy and does not actually record or playback.

Figure 1:
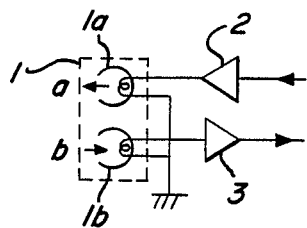
FIG. 1 is a schematic representative of a prior art multi-track recording head.
Figure 2:
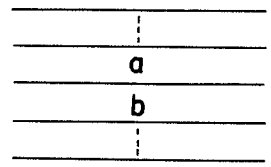
FIG. 2 is an abstract illustration of multiple tracks on a recording medium.

However, as the recording current flows in the second recording head section in the recording mode, the crosstalk signal will also appear in the previously mentioned second playback head section 11b. The playback signal itself of the signal recorded on channel "b" of the tape, however, does not appear. This is because the playback head section 11b is not touching tape 20 as shown in FIG. 2.

Now, designating the recording signal playbacked by the first playback head section 1b as $e_s$, then, playback amplifier 3 will amplify $e_s$ and crosstalk signal $e_{x1}$, and its output will be—

$$e_s + e_{x1}$$

On the other hand, playback amplifier 12 amplifies crosstalk signal $e_{x2}$. Now, $e_{x2}$ is opposite in polarity to crosstalk signal $e_{x1}$ played back by the first playback head section 1b. Gain of the playback amplifier 12 can be adjusted so that the amplitude of its output $e_{x2}$ is same as $e_{x1}$. The mixing circuit 13 receives the outputs of the playback amplifier 3 and 12, and combines them, and its output $e_o$ is expressed as follows:

$$e_o = e_s + e_{x1} + e_{x2}$$

As $e_{x2} = -e_{x1}$, the above equation can be converted to $$e_o = e_s + e_{x1} + (-e_{x1}) = e_s$$

In other words, only the recording signal $e_s$ is output from mixing circuit 13. The crosstalk signals cancelled and do not appear in the output. As a result, accurate and true playback is possible.

As sync crosstalk can be eliminated by this invention, oscillation at ping pong recording can be suppressed to a good degree. In addition, as the conventional type record/playback head can be used, a high performance multi-track recorder can be produced at low cost.

In the above explanation, the playback head section 1b and 11b of the first and second record/playback heads 1 and 11 were connected in reverse polarity to each other, but the same result can be obtained by connecting them in the same polarity and using a phase inverting amplifier for the playback amplifier 12 to reverse the polarity. Likewise, the recording head connection necessarily need not be in series and the same result can be obtained by connecting them in parallel and applying the same recording current.

As explained above in detail, this invention will allow realization of a sync crosstalk cancelling circuit for accurate playback of the recording signal by separately providing a dummy record/playback head identical in construction to the actual record/playback head, reverse the polarity of the crosstalk signal created in the playback head section of the dummy record/playback head in relation to the crosstalk signal created in the playback head section of the actual record/playback head, then mixing the two signals to obtain a playback signal with affect of the crosstalk signal eliminated.

What is claimed is:

1. In a multi-track recording system for sync recording and ping-pong recording on a magnetic medium, said system having a multiplicity of parallel recording channels with one transducer per recording channel, selectively functioning as either a record or playback head, the improvement comprising circuitry for eliminating the effect of crosstalk in the playback signal between a selected pair of record and playback transducers, said circuitry comprising:

a first record transducer and a first playback transducer located on proximate tracks of said magnetic medium for recording signals on one track of said medium and playing back signals recorded on another track of said medium;

a second record transducer and a second playback transducer of like construction to said first record and playback transducer located adjacent to each other and away from said first record and playback transducers and said magnetic recording medium, said second record transducer being connected in series to said first record transducer;

means for driving the first and second record transducers with the signal to be recorded on the magnetic medium;

means for playing back the recorded and crosstalk signals detected by the first playback transducer;

means for playing back the crosstalk signals detected by the second playback transducer in reverse polarity to the signal playing back from the first playback transducer; and means for combining the playback signals from the first and second playback transducers whereby the reverse polarity crosstalk signal from the second playback transducer cancels out the crosstalk signal from the first playback transducer.

2. The crosstalk eliminating circuitry of claim 1 wherein the means for playing back the recorded and crosstalk signals detected by said first and second playback transducers comprises:

a first playback amplifier connected to the first playback transducer; and a second playback amplifier connected to the second playback transducer.

3. The circuitry of claim 2 wherein the second playback amplifier is connected in reverse polarity to the first playback amplifier.

4. The circuitry of claim 2 wherein said means for combining the playback signals comprises a mixing circuit receiving the signals from the first and second playback amplifiers and combining them to provide a crosstalk free output signal.

5. The circuitry of claim 2 wherein the gain of the second amplifier is adjustable so that its output signal representing the crosstalk between its record and playback transducers equals the crosstalk signal between the first record and playback transducers.

6. In a multi-track recording system, circuitry for eliminating the effect of crosstalk comprising:

a first record transducer and a first playback transducer located proximate to each other and adjacent to a multi-track magnetic medium for recording signals on one track of said medium and playing back signals recorded on another track of said medium;

a second record transducer and a second playback transducer of like construction to said first record and playback transducers located proximate to each other and away from said first record and playback transducer and said magnetic recording medium;

means for driving the first and second record transducer with signals to be recorded on a single track of the magnetic medium;

means for playing back the signals detected by the first playback transducer;

means for playing back the signals detected by the second playback transducer in reverse polarity to the signal played back from the first playback transducer; and means for combining the playback signals from the first and second playback transducers whereby the reverse polarity crosstalk signal from the second playback transducer cancels out the crosstalk signal from the first playback transducer.

7. The circuitry of claim 6 wherein said means for combining the playback signals from said first and second playback transducers comprises a mixing circuit receiving the signals from the first and second playback transducers and combining them to provide a crosstalk free output signal.

8. The circuitry of claim 6 wherein the gain of the playback means for the second playback transducer is adjustable so that its output signal, representing the crosstalk between the second record transducer and second playback transducer, equals the crosstalk signal between the first record transducer and first playback transducer.

* * * * *